July 10, 1945.  J. F. PETERS  2,379,920
CAN BODY MAKER
Filed July 8, 1942  10 Sheets-Sheet 4
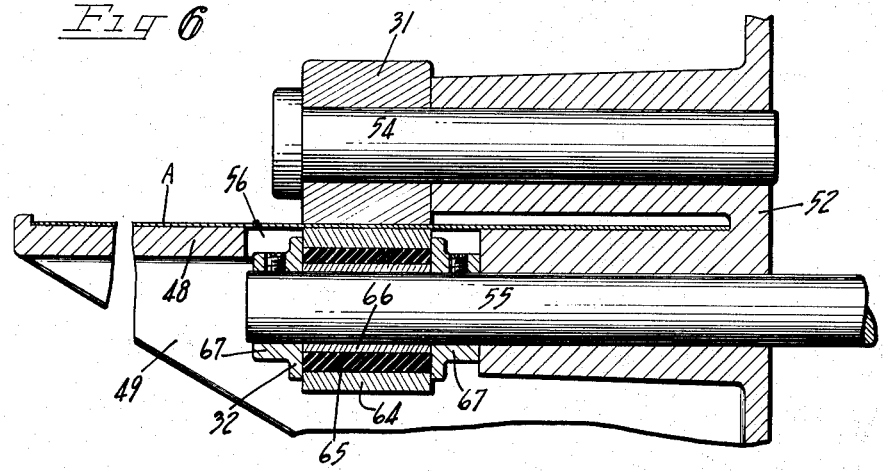
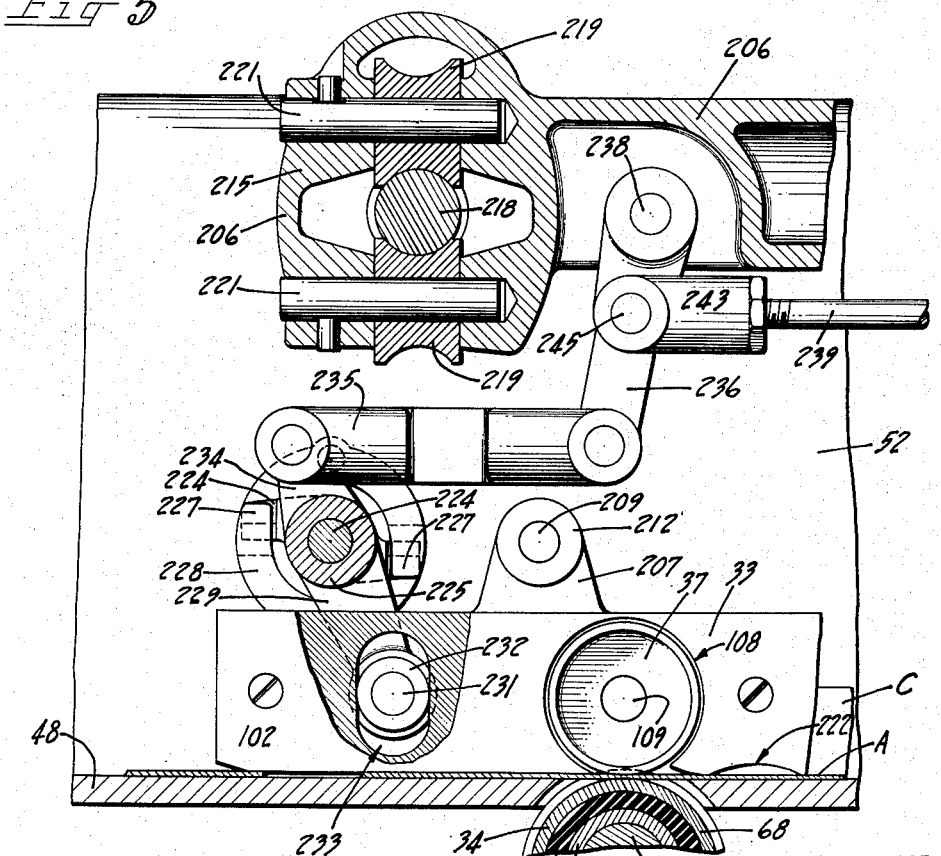

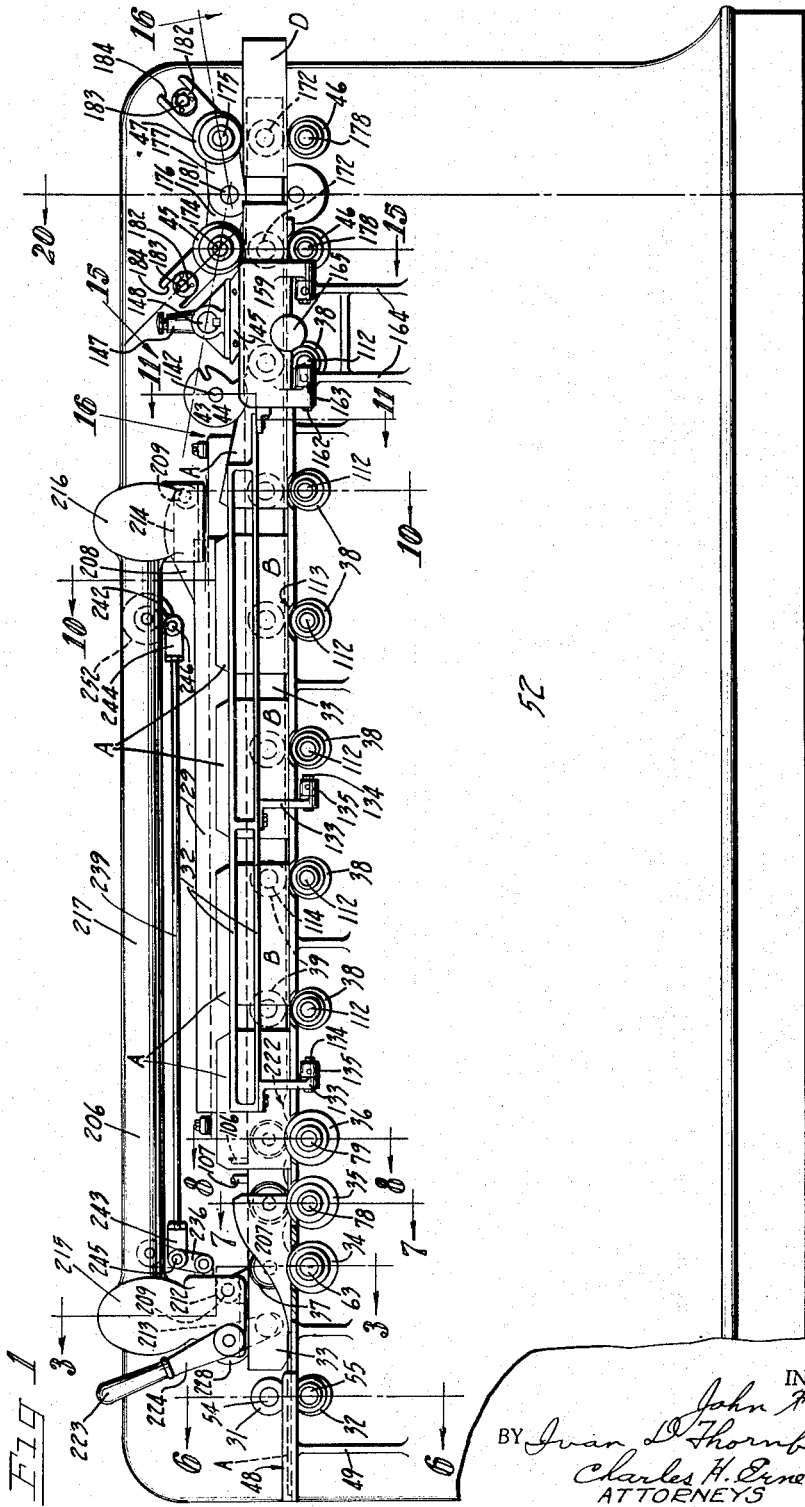

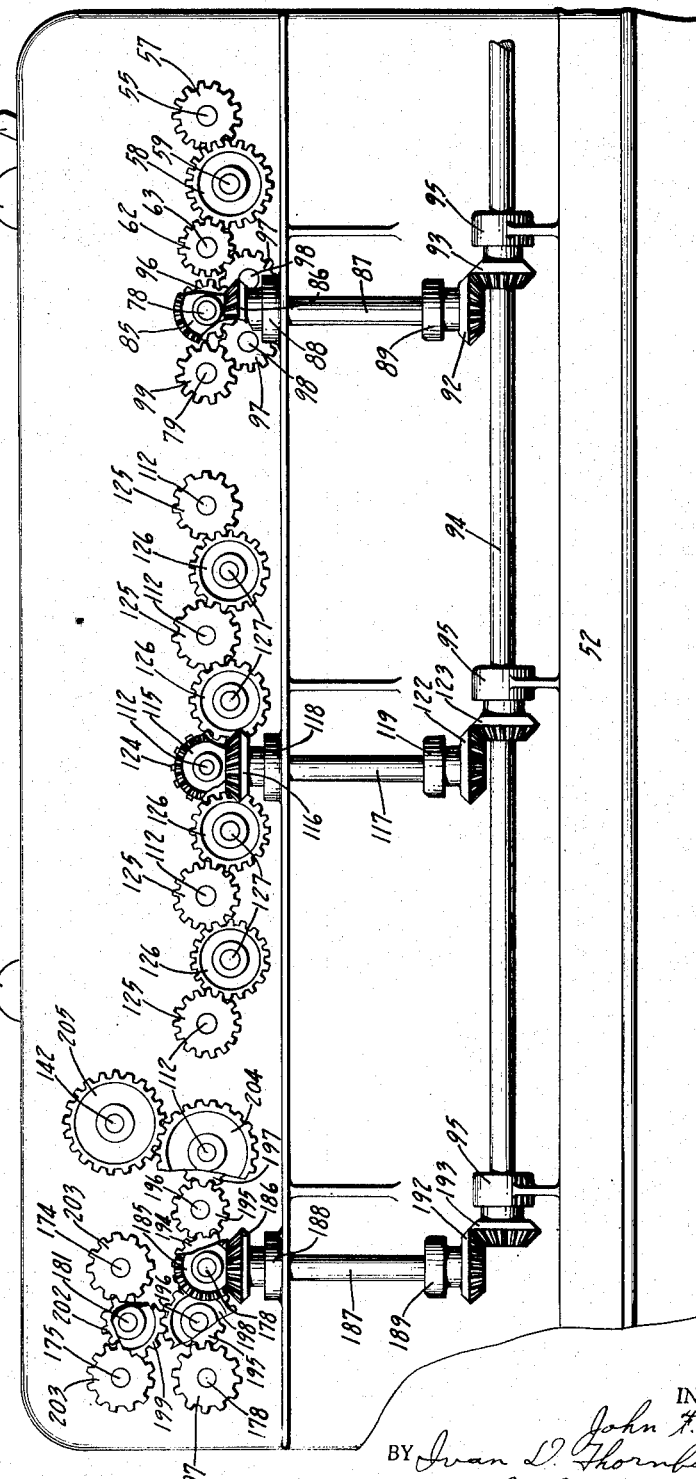

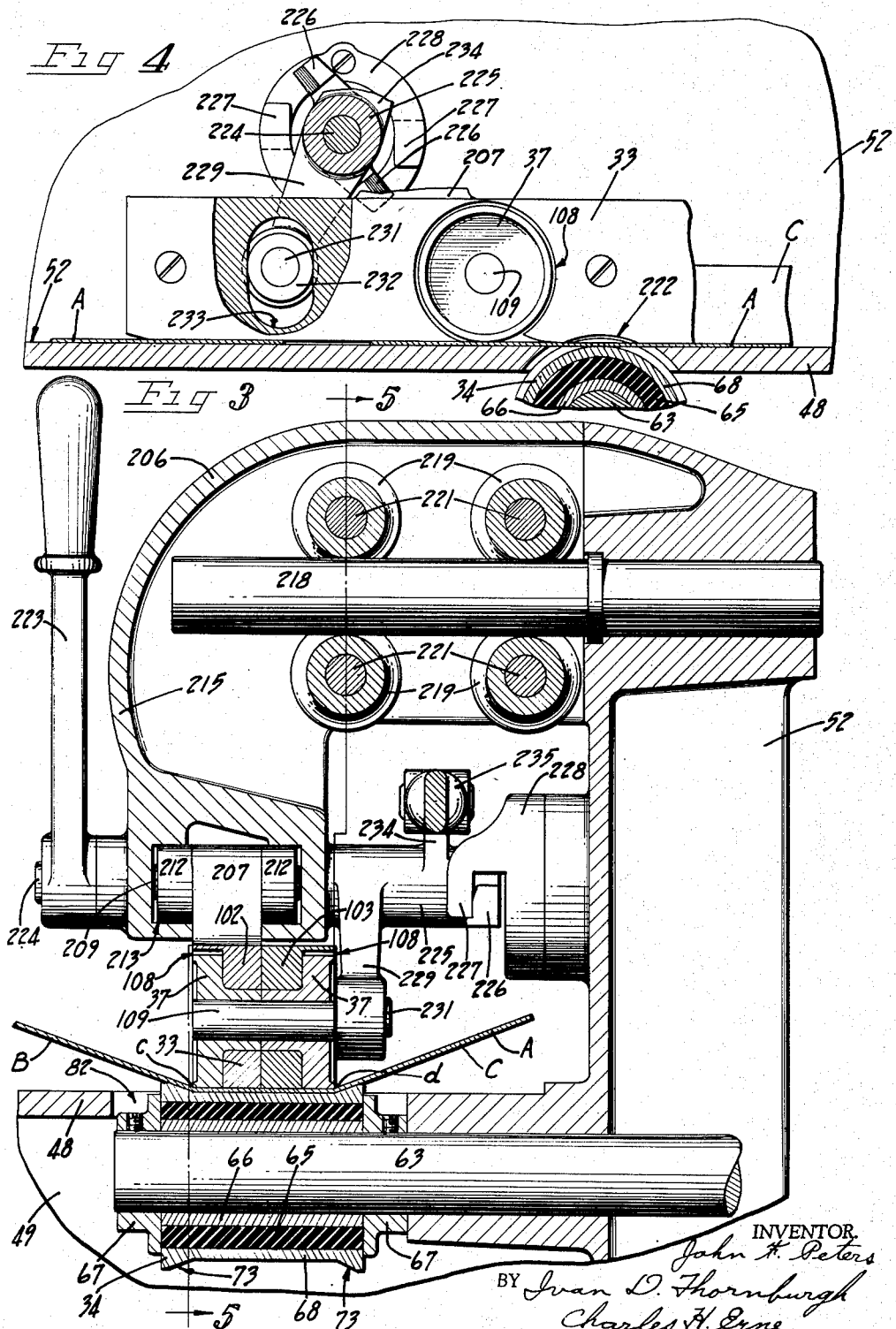

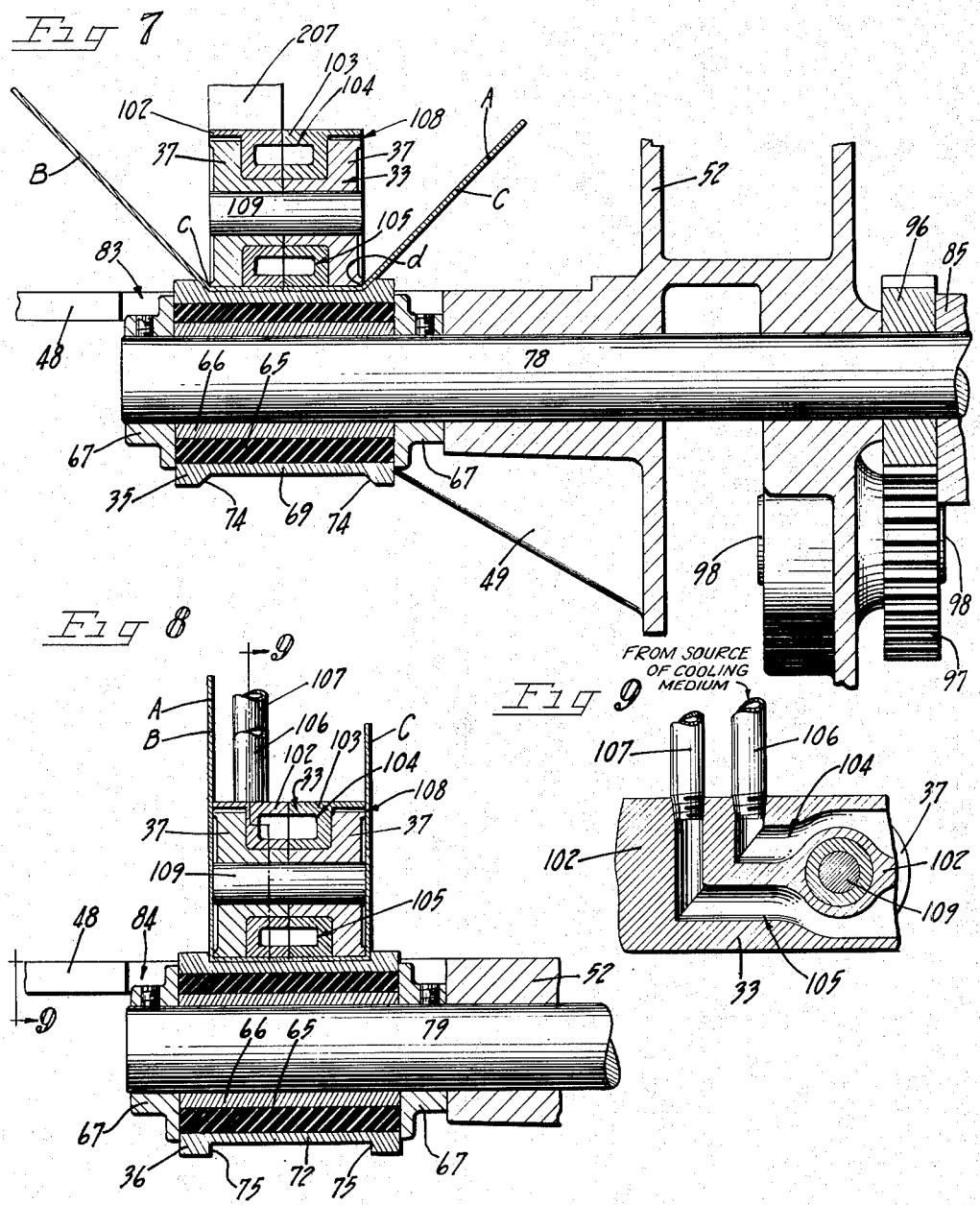

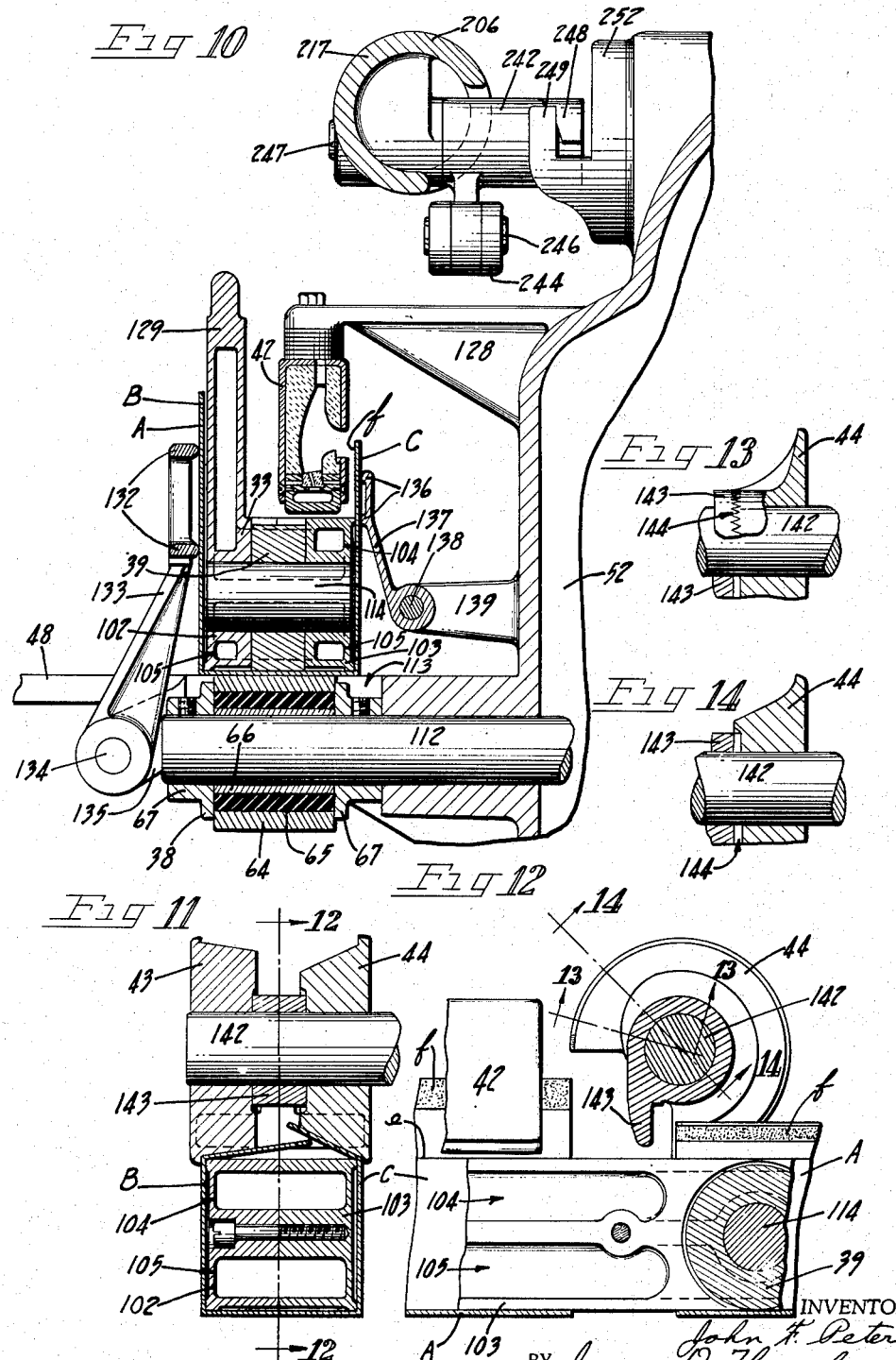

July 10, 1945. J. F. PETERS 2,379,920
CAN BODY MAKER
Filed July 8, 1942 10 Sheets-Sheet 7
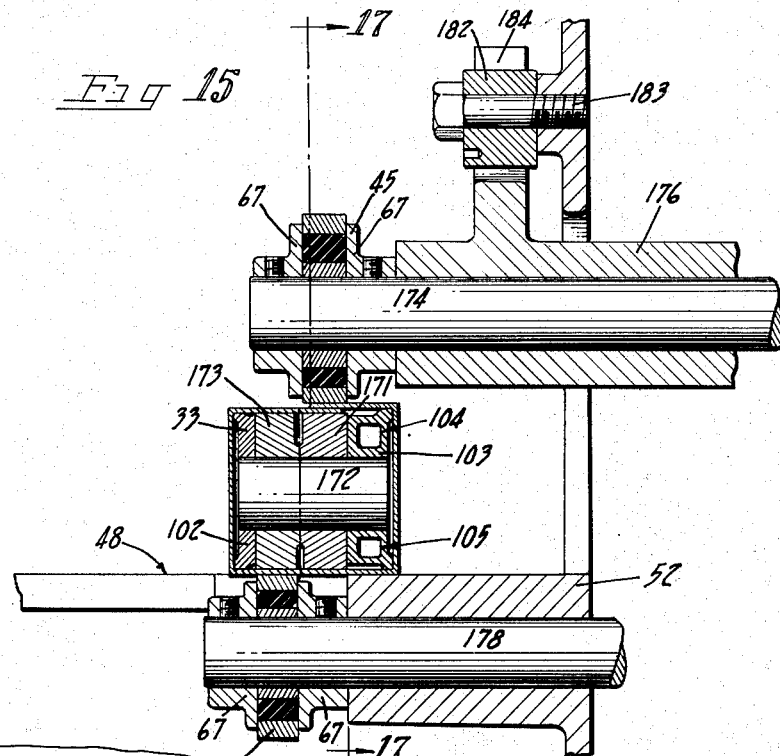
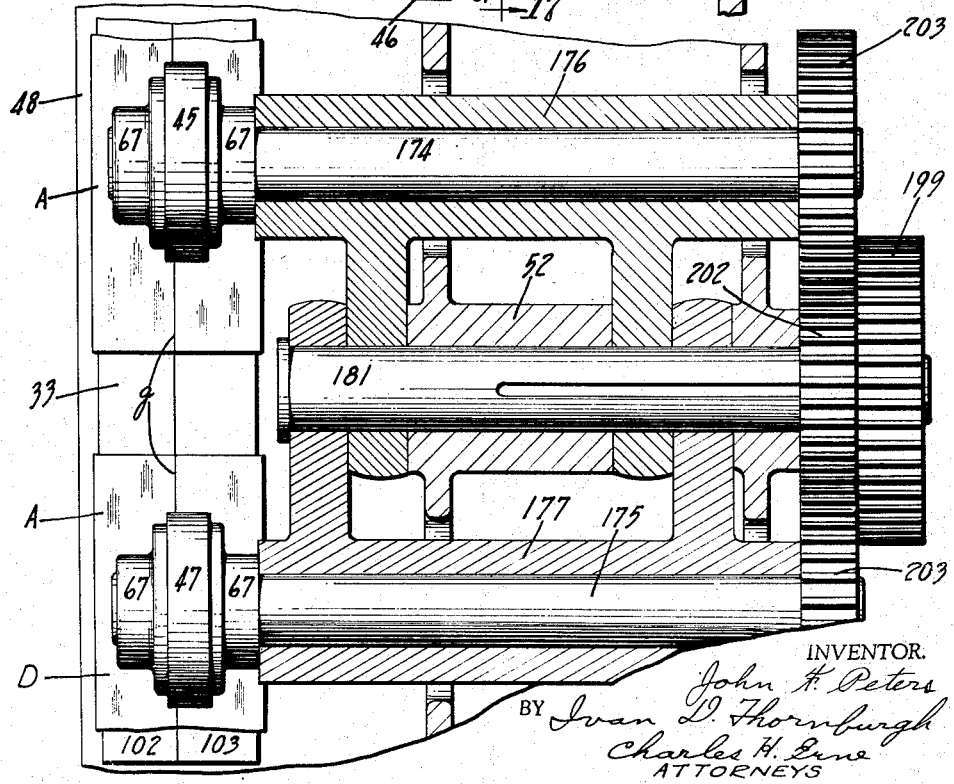
INVENTOR.
John F. Peters
BY Ivan D. Thornburgh
Charles H. Lyne
ATTORNEYS July 10, 1945.   J. F. PETERS   2,379,920
CAN BODY MAKER
Filed July 8, 1942   10 Sheets-Sheet 8

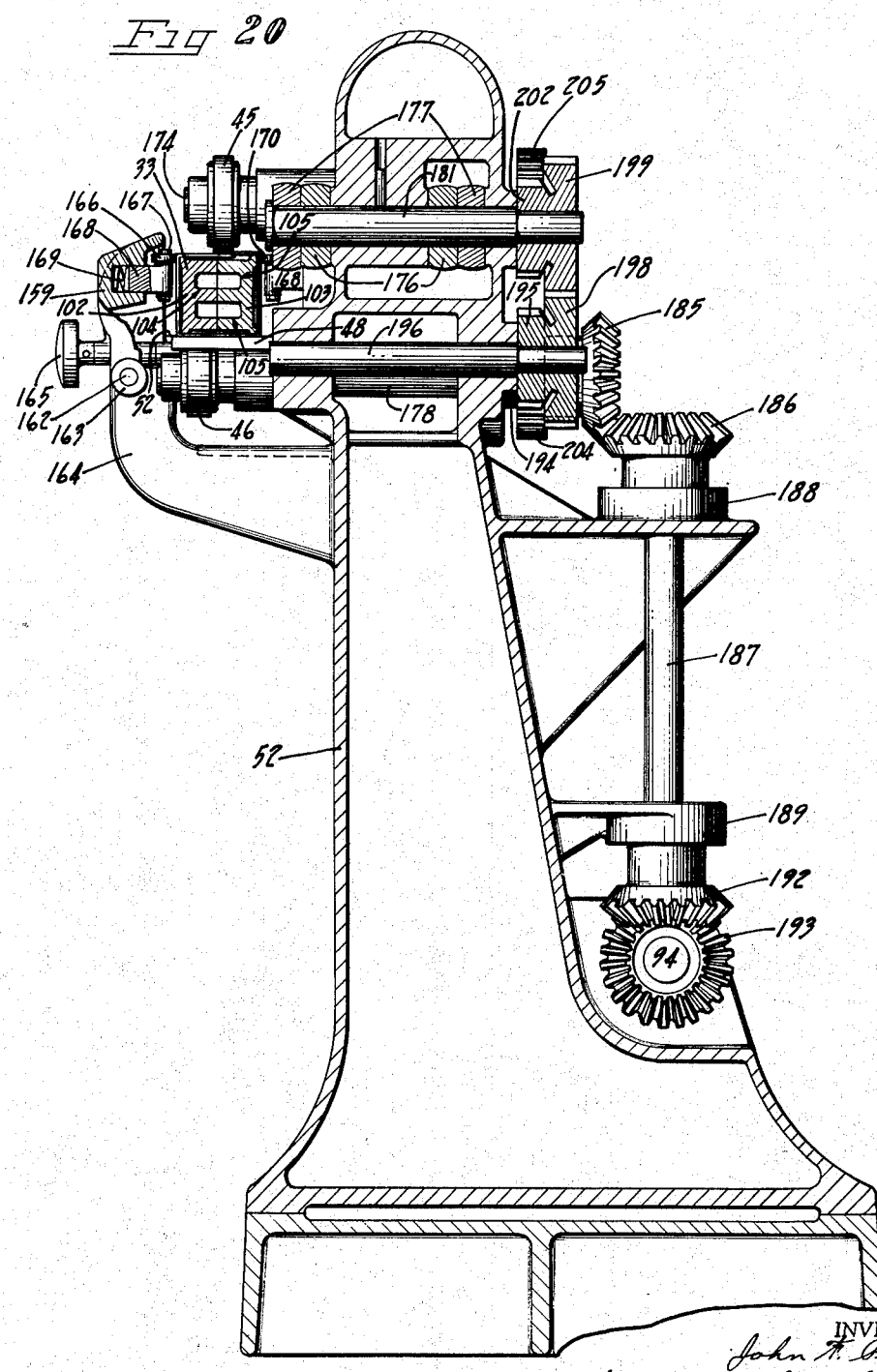

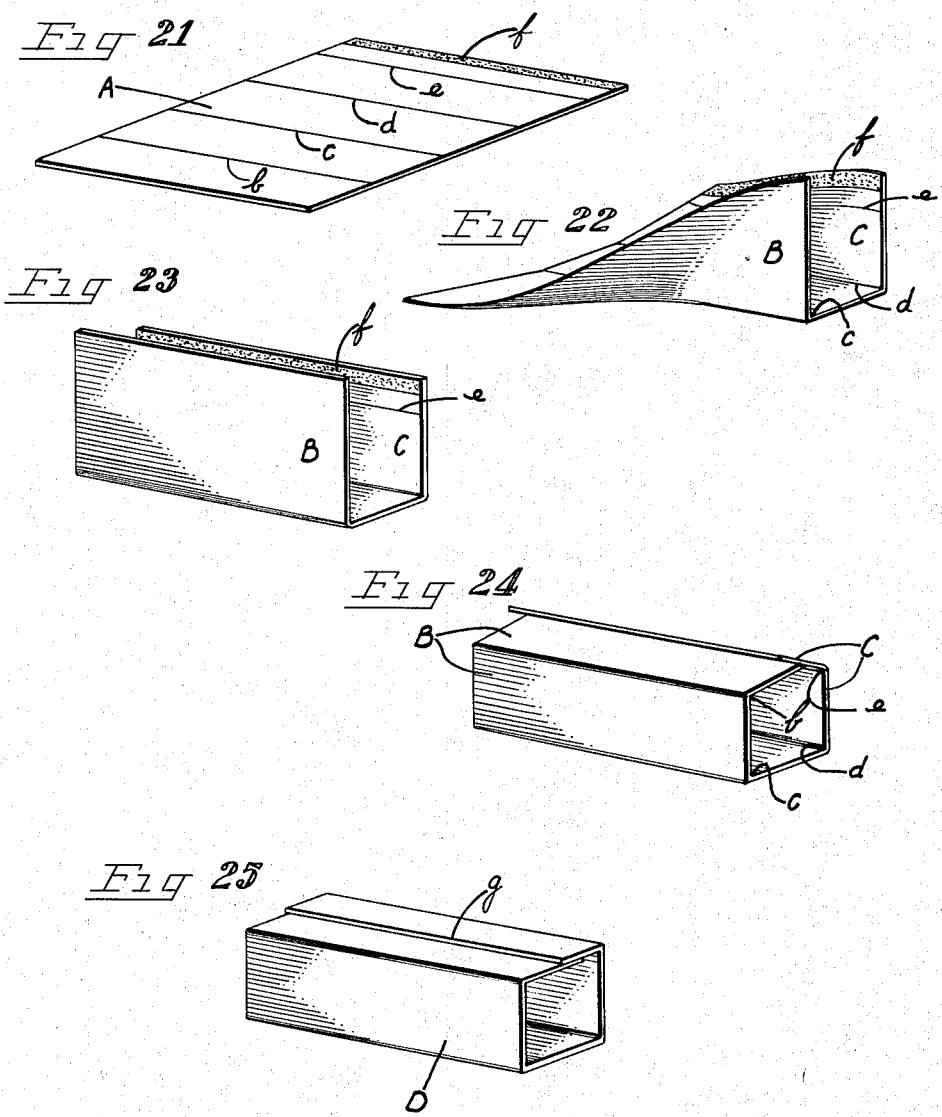

Patented July 10, 1945

2,379,920

UNITED STATES PATENT OFFICE 2,379,920

CAN BODY MAKER

John F. Peters, Leonia, N. J., assignor to American Can Company, New York, N. Y., a corporation of New Jersey Application July 8, 1942, Serial No. 450,203

14 Claims. (Cl. 93—52)

This invention relates to can body making machines and has particular reference to certain improvements in producing tubular fibre can or container bodies from flat blanks which are progressively folded into can body shape while being propelled continuously along a predetermined path of travel under high speed production, the side edges of the blanks being overlapped and secured in side seams during the formation of the can bodies.

The machine disclosed in the accompanying drawings and described herein is adapted for use in the manufacture of fibre milk containers of the character described in United States Patent 2,085,979, issued July 6, 1937, to J. M. Hothersall, on Container.

In the manufacture of fibre can bodies, it is customary to bond the side seams together with an adhesive which in the present instance is of the thermoplastic variety. The adhesive preferably is carried on the blank and is heated to a tacky bonding condition so that the overlapping surfaces of adjoining edges upon being pressed together firmly produce a hermetic seal. In applying pressure to the folded body, small particles of the adhesive sometimes are squeezed out at the edge of the seam and come in contact with the body forming horn. As moving bodies continue to pass along the horn, the particles of adhesive have a tendency to build up and will, unless removed, distort the can bodies and prevent the efficient operation of the machine.

In applying heat to the can body blanks as they are advanced along the body forming horn, usually care must be exercised for best results to avoid overheating or possible scorching of the blanks due to any retarded rate of travel along the horn or to jams which may occur incidental to the feeding of light weight fibre can blanks at high speed. Scorched or jammed body blanks usually require stopping of the machine and it is necessary to clear away such parts. In conventional body manufacture considerable difficulty is experienced in clearing away such parts as the surrounding mechanism is usually of an intricate nature.

The instant invention contemplates overcoming these difficulties by providing a removable body forming horn having a lock element which locks the working instrumentalities in operating position and which may be unlocked quickly for releasing the horn and for moving it laterally as a unit and outwardly on roller supports, thus exposing the body horn so that it may be cleaned readily of accumulated adhesive and any distorted or scorched body blanks removed.

This invention also contemplates a roller type continuous feed between which creased or scored body blanks may be fed successively and folded gradually into tubular form under high speed production.

An object of the invention is the provision of certain improvements in can making machines wherein previously prepared flat fibre blanks carrying thermoplastic adhesive adjacent at least one side seam edge, are advanced continuously along a body forming horn at high speed while being partially folded and the adhesive region heated, and then folded completely into overlapping side seam relation so that the adhesive while in a tacky condition will bond the side seam edges together in a tight side seam joint.

Another object is the provision in such a high speed machine of a removable body forming horn mounted in a carrier and having locking devices whereby certain parts including the horn may be released as a unit and rapidly shifted out of and back into working position so that it may be cleared of jams and cleaned periodically.

Another object is the provision in such a machine of combination feeding and forming rollers which are operable against the body forming horn and by which body blanks are propelled and folded into angular position for heat treatment of the adhesive along their marginal edges whereupon the blanks are folded completely into body shape and are secured in a lap seam along a side wall.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a can body making machine embodying the present invention, with parts broken away and parts in section;

Fig. 2 is a view similar to Fig. 1 showing the opposite side of the machine, with parts broken away;

Fig. 3 is an enlarged transverse section taken substantially along the broken line 3—3 in Fig. 1, with parts broken away;

Figs. 4 and 5 are enlarged sectional views taken substantially along the broken line 5—5 in Fig. 3 drawn to the same scale, with parts broken away, the views showing certain parts in different positions, and Fig. 5 showing additional parts;

Fig. 6 is an enlarged transverse section viewed substantially along the line 6—6 in Fig. 1, with parts broken away;

Figure 17:
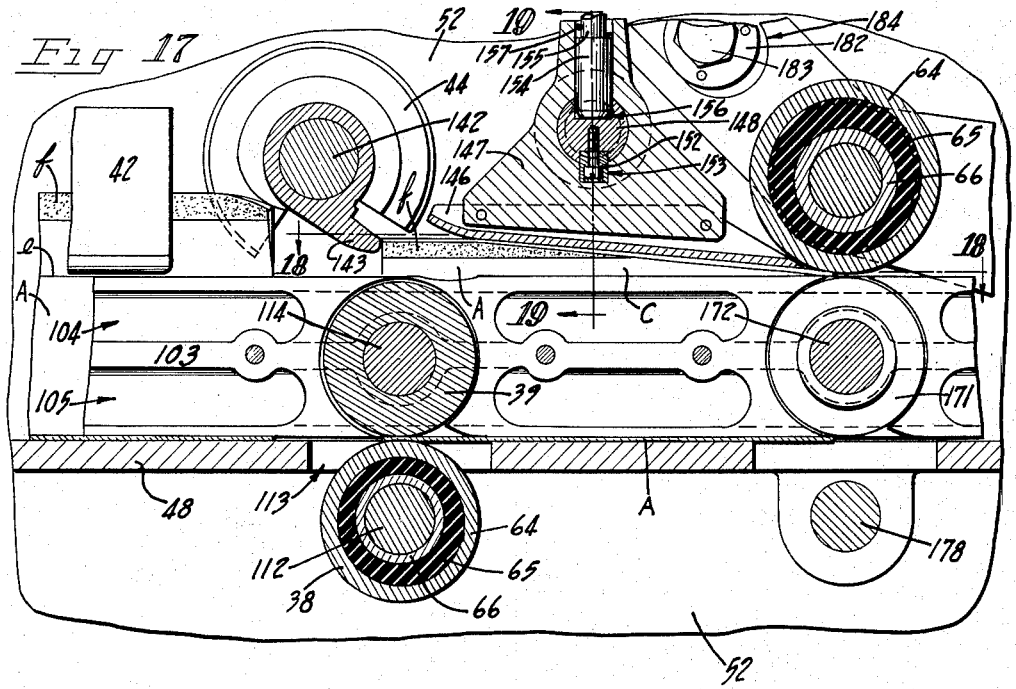
Figure 18:
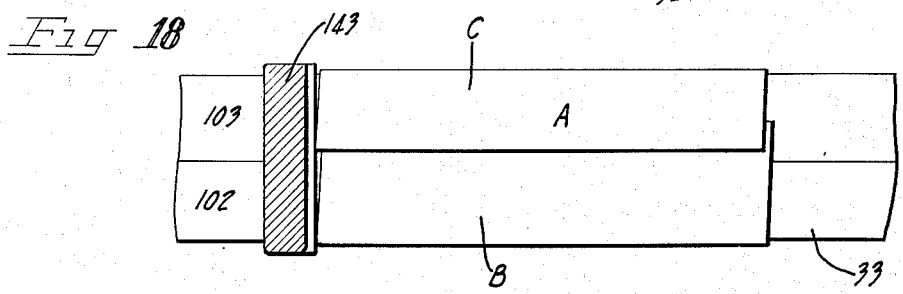
Figure 19:
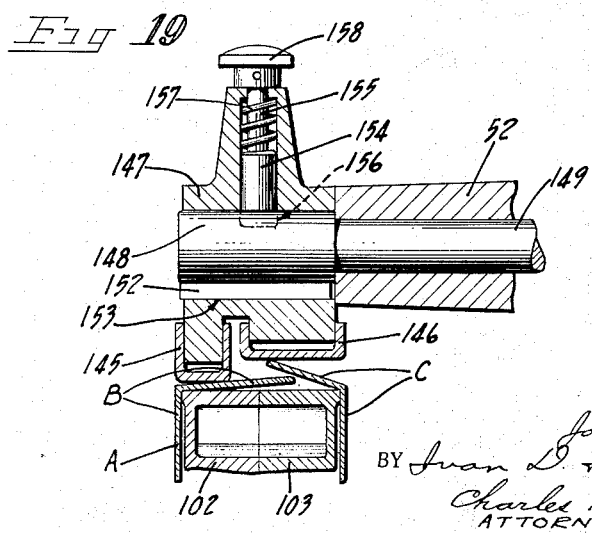

Figs. 7 and 8 are enlarged transverse sections taken substantially along the respective lines 7—7 and 8—8 in Fig. 1, with parts broken away;

Fig. 9 is a fragmentary sectional detail as viewed along the broken line 9—9 in Fig. 8, and drawn to the same scale;

Fig. 10 is an enlarged transverse sectional view taken substantially along the broken line 10—10 in Fig. 1, with parts broken away;

Fig. 11 is an enlarged sectional view taken substantially along the broken line 11—11 in Fig. 1, showing certain parts in a slightly different position;

Fig. 12 is a fragmentary sectional view taken substantially along the line 12—12 in Fig. 11, drawn to the same scale, with parts broken away;

Figs. 13 and 14 are fragmentary sectional details as viewed substantially along the lines 13—13 and 14—14 in Fig. 12, drawn to the same scale;

Fig. 15 is an enlarged sectional view taken substantially along the broken line 15—15 in Fig. 1, with parts broken away;

Fig. 16 is an enlarged sectional view taken substantially along the broken lines 16—16 in Fig. 1, with parts broken away;

Fig. 17 is a sectional view similar to Fig. 12 and drawn to the same scale, with certain parts shown in a different position and other parts added, the view being taken substantially along the broken line 17—17 in Fig. 15;

Fig. 18 is a fragmentary detail as viewed substantially along the broken line 18—18 in Fig. 17 and drawn to the same scale, with part in section;

Fig. 19 is a fragmentary sectional detail as viewed substantially along the line 19—19 in Fig. 17, and drawn to the same scale as that figure, with parts broken away;

Fig. 20 is a transverse section of the machine taken substantially along the vertical line 20—20 in Fig. 1, the view being drawn to a different scale; and Figs. 21, 22, 23, 24 and 25 are perspective views showing a prepared can body blank from which the tubular can body is formed and illustrating progressive stages in the folding of such a blank to complete the formation of the body.

The machine embodying the instant invention is arranged to receive individual, previously prepared flat fibre blanks A (Fig. 21) in rapid succession, each blank having longitudinal creases or score lines b, c, d and e. The body blanks are fed into the machine by feed rollers 31, 32 located at one end (at the left as viewed in Fig. 1). Each flat blank is advanced beneath a body forming horn 33 and over a series of yieldable pressure feeding and forming rollers 34, 35, 36 which are disposed and operated in cooperation with idler rollers 37 carried in the forming horn so that body blanks can be moved freely along their path of travel.

The rollers 34, 35 and 36 (Figs. 3, 7 and 8) are arranged so that each will impart a partial fold or angular bend along the creased lines c and d of the blank A. This is best illustrated in Fig. 22 wherein opposite upstanding wall parts B, C are deflected upwardly and inwardly and finally are placed into a vertical position (Fig. 23) against the sides of the forming horn 33. The bodies while in this position are propelled along the horn by a series of spaced pressure feeding rollers 38 which like rollers 32, 34, 35 and 36 are of yieldable construction and will be described fully hereinafter.

A plurality of idler rollers 39 are mounted in the body forming horn 33, there being one of each of these rollers for operation with the individual pressure feeding rollers 38 (Figs. 1 and 10) mounted beneath the horn. Figure 10 also shows a heating device 42 disposed above the body forming horn 33 and extended therealong. This type of heating device is described fully in the United States Patent 2,196,982, issued April 16, 1941, to Herbert F. Cox, on a Can body making machine.

In the partially folded body blanks A moving along the horn 33 the wall part C carries the thermoplastic adhesive f. This adhesive is subjected to radiant heat from the heating device 42 as the body blanks are moved along the horn adjacent the device. Thus the adhesive is heated to a desired degree of tackiness. While the adhesive is in this condition, the marginal edge portions of the wall parts B and C are folded downwardly into overlapping relation as best shown in Fig. 24, by cam shaped rollers 43, 44 (Figs. 1, 11, 12 and 17), preparatory to bonding the lapped portions together. The wall parts B and C preferably are folded along the creases b, e for forming the body with the lapped portions on a side wall. The lapped portions thereafter are aligned while the thermoplastic adhesive is still in a tacky condition just prior to final sealing.

The sealing of the lapped edge portions is done by a pressure feeding and sealing roller 45 which is mounted above the horn 33 (Figs. 1, 15, 16, 17 and 20). After this initial sealing and as the body is advanced along the horn 33 by a pressure feed roller 46, a final pressing roller 47, identical in construction to the initial sealing roller and which is adjacent thereto, permanently presses or irons the lapped edge portions together into a fully hermetic side seam g (Fig. 25). This completes the tubular fibre can body. Such a tubular can body then is discharged from the machine (at the right as viewed in Fig. 1) for subsequent can operations, by the action of the final pressing roller 47 above the horn and the pressure roller 46 mounted below the horn.

Referring now to the machine in detail, reference first should be had to Figs. 1, 2 and 20 which illustrate the machine in general. The fibre blanks A as they enter the machine and are propelled therethrough are supported on a table 48 which extends for nearly the full length of the machine. The table is formed as a part of brackets 49 which are carried on a machine main frame 52. The blanks A are placed onto the table 48 in any suitable manner and are fed individually by any suitable means into the initial feeding rollers 31, 32. This set of rollers and the cooperating sets of feed and forming rollers 34, 35, 36, 38, 46 hereinbefore mentioned are located one above and one below the table along its length. The roller 31 is carried rotatably on a shouldered shaft 54 mounted in the frame 52. The pressure feed roller 32 is secured to a shaft 55 journaled in the frame 52.

The pressure feed roller 32 operates in an opening 56 formed in the table 48 (Fig. 6). The shaft 55 on which the feed roller is mounted is rotated by a gear 57 which meshes with an idler gear 58 carried on a stub shaft 59 mounted in the frame 52 (Fig. 2). The gear 58 is driven by a gear 62 carried on a shaft 63 journaled in the frame. The gear 62 also drives the shaft 63 on which the pressure feeding and forming roller 34 is mounted and thus rotates the roller 34 in time with the feeding rollers 31, 32.

The pressure feeding roller 32 is preferably of a yieldable construction comprising an outer metallic ring 64 and an inner metallic ring or hub 66 between which a resilient ring or core 65 (Fig. 6) is interposed. Such a resilient ring may be made of rubber or other yieldable material and may be vulcanized or otherwise secured to the metallic rings 64, 66. The hub of this roller is mounted on the feed roller drive shaft 55 and is secured thereto by washers 67 disposed adjacent the ends of the rollers. These washers retain the ring parts against lateral displacement.

The feeding rollers 31, 32 advance the body blank A along the table 48 beneath the body forming horn 33 and over the yieldable pressure feeding and forming rollers 34, 35, 36. These rollers press the body blanks against the idler rollers 37, which are carried in the body forming horn 33 so that the blanks may be formed around the horn while they are advanced therealong.

As hereinbefore mentioned, the pressure feed rollers 32, the pressure feeding and forming rollers 34, 35, 36 and the pressure feeding rollers 38, 46, are disposed adjacent the table 48. In this location they are also arranged in spaced relation beneath the horn 33. The rollers are all operated at the same speed, and are substantially of the same yieldable construction. Hence at least one feeding roller is in engagement with each of the moving body blanks for continuously advancing them along the horn at high speed without undue squeezing or distorting of the blank. The resiliency of the rubber rings 65 permits of this yielding action and at the same time keeps the outer ring of each roller in engagement with the blank and the blank in frictional engagement against its cooperating idler roller carried in the body forming horn.

The yieldable feeding and forming rollers 34, 35, 36 (Figs. 3, 7 and 8) have modified outer ring constructions 68, 69, 72. Each of these rings have flanges formed with suitable angularly disposed shoulders 73, 74, 75. These shoulders upon being engaged against the creased blanks, as they are moved along the horn, sharply and progressively bend them along the crease lines c and d into a final condition as illustrated in Fig. 8.

The yieldable pressure feeding and forming rollers 34, 35, 36 are mounted on spaced and parallel shafts 63, 78, 79 which are journaled in the main frame 52. These rollers, like the pressure feed roller 32, are operable in openings 82, 83, 84 formed in the table 48 (Figs. 1, 3, 7 and 8).

The shaft 78 (Fig. 2) is rotated by a bevel gear 85 which is mounted on the end of the shaft. The bevel gear meshes with and is driven by a bevel gear 86 mounted on the upper end of a vertical shaft 87. This shaft is journaled in suitable bearings 88, 89 formed in the main frame 52. A bevel gear 92 mounted on the lower end of the shaft 87 meshes with and is driven by a bevel gear 93 secured to a main drive shaft 94. This main drive shaft is journaled in suitable bearings 95 formed in the machine main frame 52. The drive shaft may be driven in any suitable manner.

The shafts 63, 79 are driven from the shaft 78 by suitable gears as will be described. A spur gear 96 mounted on the shaft 78 adjacent the bevel gear 85 (Fig. 2) meshes with and drives a pair of idler spur gears 97 carried on stub shafts 98 mounted in the frame 52. One of the idler gears 97 meshes with the gear 62 on shaft 63 while the other idler gear 97 meshes with a spur gear 99 mounted on shaft 79. The gear 62 also meshes with the idler spur gear 58 which drives the spur gear 57 for rotating the shaft 55. In this manner the feed roller 32 and the pressure feeding and forming rollers 34, 35, 36 are driven simultaneously for feeding individual body blanks and for folding the adjoining side walls B and C (Fig. 22) into a vertical position as illustrated in Figs. 8, 10 and 23, as hereinbefore explained.

The body forming horn 33 about which body blanks A are folded is substantially rectangular in shape and extends nearly the full length of the machine (Figs. 1, 3, 4, 15 and 20). This horn preferably is made in two transverse sections 102, 103 each of which is formed with a plurality of longitudinal channels which, when the two halves of the horn are assembled, provide an upper passageway 104 and a connecting lower return passageway 105 for the circulation therethrough of a cooling medium such as water.

Circulation of the cooling medium through the horn is effected by way of an inlet pipe 106 and an outlet pipe 107 (Figs. 1, 8 and 9). The inlet pipe 106 is connected into a threaded opening formed in section 102 of the horn and leading to the circulation passageway 104. The outlet pipe 107 is secured in a similar opening which leads from the return passageway 105. The flow of the cooling medium through the inlet and outlet pipes and through the horn when the machine is in operation keeps the temperature of the horn in the region of the heating device 42 (Fig. 10), at the desired degree. This prevents scorching of the container body blanks coming in contact with the horn as they are advanced therealong.

The horn 33 has a plurality of clearance openings 108 formed in the horn in which idler rollers 37 operate for tangential rolling action at the lower surface of the body forming horn. Thus the rollers cooperate with the pressure feeding and forming rollers 34, 35, 36 for easy passage of the body blanks upon being advanced along the horn. The idler rollers 37, preferably arranged in sets of two (Figs. 3, 4, 5, 7 and 8), are formed with trunnions which are journaled in the horn 33 from opposite sides. Each set of rollers is mounted on a pin 109 carried in the horn.

Following the folding of the wall parts B and C of a body blank A into vertical position against the opposite sides of the horn 33, the blank is advanced along the horn by the action of the pressure forming and feeding roller 36. Thus the blank is moved into engagement with the first of a plurality of yieldable pressure feeding rollers 38 (Figs. 1 and 10). There are six of these rollers arranged in series beneath the horn and they are adapted to continuously advance the blank. These rollers 38 advance the folded blank along the portion of the horn that is in the region of the radiant heating device 42, so that the coating of thermoplastic adhesive f on the side C of the blank will be brought to a tacky state prior to joining the side edges, as will be described hereinafter.

The pressure feeding rollers 38 are similar to the pressure feed roller 32 and are rotated continuously on shafts 112 journaled in the frame 52 (Fig. 10). These rollers operate in cut-out sections 113 formed in the table 48 and are adapted to bear against the idler rollers 39 which are rotatable on pins 114 mounted in the horn 33.

One of the shafts 112 serves as an auxiliary drive shaft and carries a bevel gear 115 (Fig. 2) which meshes with and is driven by a similar gear 116 mounted on the upper end of a vertical shaft 117. The shaft 117 is journaled in bearings 118, 119 in the frame 52. Bevel gears 122, 123, which are similar to bevel gears 92, 93, connect the lower end of vertical shaft 117 with the main drive shaft 94.

A spur gear 124 mounted on the auxiliary drive shaft 112 adjacent the bevel gear 115 rotates the pressure feed rollers 38 by means of spur gears 125, which are similar to spur gear 124. Each gear 125 is moutned on a corresponding shaft 112. Idler gears 126 interposed between the gears 125 and mounted on stub shafts 127 carried in the frame 52, complete the gear train.

The radiant heating device 42, described fully in the previously mentioned Cox patent, is disposed above the body forming horn 33 (Fig. 10) and is carried by brackets 128 of the frame 52. This heating device radiates a restricted beam of radiant heat onto only that portion of the blank where it is desired, so that sufficient concentrated heat may be applied and confined to the thermoplastic adhesive f on the blanks and kept away from the adjacent uncovered areas. This method of applying the heat thus prevents scorching or other detrimental effects upon the blanks.

An upright leg section 129 integral with the horn section 102 extends along the horn at one side of the heating device 42. This upright leg section like the horn proper also is water cooled and this maintains the temperature of the wall part B of the blank at the desired degree. Side guide rails 132 disposed adjacent the outer vertical surface of the leg section 129 keep the wall part B of the moving body blank A in a vertical position as the latter is advanced along the horn 33. These rails are supported by brackets 133 (Figs. 1 and 10) carried on pins 134 mounted in lugs 135 of the frame 52.

Likewise, guide rails 136 formed integral with a side guide 137, are directed against the wall part C of the blank A to keep that wall part in a vertical position against the horn and adjacent the heating device 42. The side guide 137 is carried on pins 138 mounted in brackets 139 of the frame 52.

As the body blanks A are propelled continuously along the horn 33 and the thermoplastic adhesive f is rendered tacky, the blanks approach the cam shaped rollers 43, 44 (Figs. 1, 11, 12 and 17), whereupon the marginal edge portions of the wall parts B and C of the blanks are folded down into overlapping relation. The cam shaped rollers 43, 44 which perform this operation are secured to a shaft 142 journaled in the frame 52 and are rotated in timed relation with the moving body blank. An aligning finger 143 is interposed between the rollers. This finger is mounted on shaft 142.

The outer periphery of the cam rollers 43, 44 are shaped with a nearly vertical and slightly curved section (as best shown in Fig. 13) which merges through an inwardly tapered section (Fig. 14) into the flatter tapered section in Fig. 11. These tapered sections of the rollers are designed to engage the vertically disposed wall sections B and C of the moving body blank and to lay them down flat in overlapping relation while folding them along the creases b and c to form one of the side walls of the container. This is best illustrated in Figs. 11 and 17 of the drawings which show the lap sections being placed into position so that the tacky thermoplastic adhesive will bond the lapped edge portions together.

Serrations or teeth 144 are provided on the inner adjacent surfaces of the hubs of the rollers 43, 44 and the hub section of the aligning finger 143 (Figs. 13 and 14) for locking the cam rollers relative to each other and to this finger in a desired angular position. The aligning finger 143 extends outwardly adjacent a cut away section in each of the cam rollers. The advancing body blank upon being folded by rotary action of the rollers 43, 44 into overlapping relation (Figs. 11 and 12), gets a final squaring up treatment (Figs. 17 and 18) before being squeezed together by the sealing roller 45. This is done by the finger 143 while the folded can body blank is moving and while the overlapped relation of the blank parts is retained in such position by a pair of hold-down shoes 145, 146, beneath which the blank passes (Figs. 17 and 19).

The hold-down shoes 145, 146 extend longitudinally of the horn 33 and are disposed above the horn. These shoes are located side by side in parallelism but at different elevations. Shoe 145 is lower than shoe 146 and in such relation shoe 145 holds the flap B of the moving blank spaced away from the flap C so that the adhesive on the latter will not yet contact flap B. Both shoes taper toward the horn, from the cam rollers 43, 44 toward the sealing roller 45. This construction of hold-down shoes prevents engagement of the overlapped edges of the flaps B and C until the blank actually contacts the sealing roller 45.

The hold-down shoes 145, 146 preferably are U-shaped in cross-section. The vertical legs of the shoes extend up adjacent and are secured to a pair of depending lugs formed on a shoe holder 147. The shoe holder is mounted on an enlarged end 148 of a rod 149. This rod is carried in the machine frame 52. A key 152 is secured to the enlarged end of the rod 149 and engages in a key slot 153 cut in the shoe holder. Thus the shoe holder together with the hold-down shoes 145, 146 are positioned to guide the lapped wall sections of the body blanks A on the horn 33 toward the sealing roller 45.

The shoe holder 147 (together with the hold-down shoes 145, 146) is made removable as a unit so that it can be withdrawn quickly for the removal of the body forming horn 33 in the event that the body blanks become jammed. For this purpose a plunger 154 on one end of a stem 155 is carried in the shoe holder 147. This plunger engages into a recess 156 in the pin section 148 and is held by a spring 157. A knob 158 is secured to the stem 155 and may be raised for the release of the shoe holder 147.

While the folded blank is passing along this portion of the horn 33 located between the cam shaped rollers 43, 44 and the sealing roller 45, the squaring finger 143 engages against the back edges of the overlapped flaps B and C as shown in Figs. 17 and 18 and applies a slight longitudinal pressure to the flaps. This pressure shifts one or both flaps to bring their front and back edges into transverse alignment or in other words, to square the edge.

It is desirable to retain those portions of the wall parts B and C which are not being bent, as the blanks are moving through the folding operation just described, so that these unfolded parts engage against the body forming horn 33. For this purpose a removable side guide 159 (Figs. 1 and 20) is located adjacent the horn. The side guide is carried on pivot pins 162 mounted in lugs 163 of a bracket 164 on the frame 52. This guide serves as a continuation of the side guide rails 132 at the region where the wall parts B and C of the body blanks are folded down into overlapping relation. Side guide 159 is held in normal operating position by a hand knob 165 which locks the guide in place.

The side guide 159 carries a plurality of rollers 166 which are disposed adjacent the horn 33. These rollers are forced by spring pressure against the moving body blanks as they advance along the horn and thus keep them in position against the horn. The rollers 166 are carried on pins 167 mounted in a slide 168 carried in the guide. This slide is backed up by compression springs 169 which are located in the guide. Similar rollers 170 are located on the opposite side of the horn for holding the side wall C of the blanks in contact with the horn. These rollers are supported in slides 168 carried in the machine frame 52.

When the overlapped edges of a body blank A have been shifted into squared position, they are brought together immediately and sealed down tight in a body side seam by the sealing roller 45, as hereinbefore mentioned. The roller 45 assists in advancing the blank and presses the edges of the blank against an idler roller 171 (Figs. 15 and 17) which rotates on a fixed pin 172 carried in the horn. A similar roller 173 also is mounted on the pin 172 alongside of the roller 171 and cooperates with the feed roller 46, which is located below the horn at that point. Roller 173 cooperates with the feed roller 46 to advance the blank along the horn. This effects the initial sealing step.

It will be observed that rollers 45, 171 are substantially the same width of the lapped parts of the side seam. This insures a better pressure on the side seam during sealing and allows a better feeding action. In like manner, the roller 173 and its associated roller 46 are just wide enough for proper feeding and to avoid pressing the body wall upwardly against the roller 171 which operates in the opposite direction.

Following this initial side seam forming step, pressure is applied again to the side seam of the blank for the final sealing as the blank passes beneath the pressing roller 47. The final sealing step is effected by the rollers 47 and cooperating rollers of identical construction to the rollers 171, 173 already described. It is this bonding together of the side seam edges that completes the forming of a blank into the tubular can body (designated by the letter D in Fig. 25). Then the body is discharged from the horn to any suitable place of deposit.

The pressure feeding and sealing roller 45 and the pressing roller 47 are mounted above the horn on shafts 174, 175 journaled in hinged brackets 176, 177. The pressure feeding rollers 46 beneath the horn are mounted on shafts 178 journaled in the frame 52.

The hinge brackets 176, 177 are carried on a stationary shaft 181 mounted in the frame. These brackets may be rocked slightly on the shaft 181 so that the initial and final sealing rollers 45, 47 are adjusted to exert the desired pressure on the side seams g of the cam bodies (Figs. 1, 15 and 16) for the sealing steps.

The brackets are rocked into such desired position by manually rotatable eccentrics 182 mounted on locking bolts 183 threaded into the machine frame 52. These eccentrics operate within a forked lug 184 which is formed on each of the brackets 176, 177. After such an adjustment the eccentrics are locked in place by tightening down on the lock bolts 183 and this holds the brackets and the rollers carried thereon in the adjusted position.

One of the shafts 112 and shafts 142, 174, 175, 178 are rotated by cooperating spur gears which are mounted at one end of each of the shafts (Figs. 2 and 16). One of the two shafts 178 (see also Fig. 20) has a bevel gear 185 mounted thereon which meshes with and is driven by a bevel gear 186 mounted on the upper end of a vertical shaft 187. This shaft 187 is journaled in bearings 188, 189, in the frame 52. Bevel gears 192, 193 connect the lower end of this vertical shaft 187 for operation with the main drive shaft 94 of the machine. A spur gear 194 mounted on this shaft 178 adjacent the bevel gear 185 meshes with a pair of idler gears 195 which are mounted on stub shafts 196 carried in the machine frame. The gears 195 also mesh with and drive associated spur gears 197 which are mounted one on the other shaft 178 and one on the adjacent shaft 112.

A spur gear 198 (Figs. 2 and 20) formed integrally with one of the idler gears 195 is mounted rotatably on the shaft 196 and this gear meshes with and drives a gear 199 which is mounted loosely on the stationary shaft 181. The gear 199 has a gear 202 formed integrally therewith and this meshes with and drives a pair of spaced spur gears 203 mounted on the shafts 174, 175. Through this train of gears and their connection with the main shaft 94 the rotation of the pressure sealing roller 45 and the pressing roller 47 is maintained in timed relation with the pressure feeding rollers 46 and with all of the other feed rollers in the machine. A drive gear 204 is mounted on the outer end of the shaft 112, which carries the gear 197, and meshes with a gear 205 secured to the shaft 142.

Provision is made for supporting the forming horn 33 in such a manner that it may be readily shifted out of its operative position for cleaning or for clearing the machine of jams or can body wrecks. For this purpose the forming horn is supported on a carrier 206 (Fig. 1, 3, 5 and 10) by way of lugs 207, 208 which project up from the top of the horn adjacent its ends. Each lug carries a pin 209 upon which a pair of rollers 212 are mounted. The rollers are located in horizontal grooves 213, 214 formed in a pair of spaced carrier housings 215, 216 located adjacent the ends of the horn. The housings are an integral part of a connecting elongated tubular section 217.

The horn carrier 206 is supported at each of its ends on laterally extended and horizontally disposed studs or rails 218 mounted in the machine frame 52 (Figs. 3 and 5). Grooved rollers 219 ride on and are disposed above and below the studs 218. These rollers are carried on pins 221 which are secured in the carrier housings 215, 216 (Figs. 3 and 5). This construction permits easy rolling action for the horn carrier 206 when it is moved outwardly laterally of the machine. A stop may be provided at the end of each stud 218 if desired to limit the outward movement of the horn. Usually, however, stops are not used as full removal of the horn and horn carrier as a unit is desired.

Provision is made also for shifting the horn longitudinally of the machine as an incident to disengaging the horn from the flanged forming rollers 34, 35, 36 and from the feeding rollers 38, 46. The horn at places adjacent the flanged rollers is formed with offset clearance recesses 222 which when the horn is shifted are brought into concentricity with the rollers to permit of lateral movement of the horn as described above. The longitudinal shifting of the horn is brought about by a hand lever 223 which is provided at the left of the machine, as viewed in Fig. 1. Shifting of this lever also locks or unlocks the horn and the horn carrier from the frame of the machine, here being an operative and an inoperative position for these parts.

The hand lever 223 (Fig. 3) is secured to the outer end of a rod 224 mounted in the horn carrier housing 215. The inner end of the rod carries a lever 225 (see also Figs. 4 and 5) which is formed with a double acting latch 226. This double acting latch is adapted to cooperate with locking lugs 227 on a lock element 228, secured to the frame 52. This locks the horn carrier and the horn in an operative position.

One leg 229 of the lever 225 extends downwardly and carries a pin 231 upon which a roller 232 is mounted for operation within an elongated vertical opening 233 in the horn 33. Thus, by actuation of the hand lever 223 the horn may be shifted longitudinally, either prior to or following a horn removal operation.

The opposite leg 234 of the lever 225 is connected by a link 235 to a rocker lever 236 which is mounted on a pivot pin 238 secured in the horn carrier 206. The rocker lever 236 is joined by a threaded rod 239 to a lever 242 (Figs. 1 and 10) which is mounted near the opposite end of the horn carrier 206. The ends of the rod 239 are threadedly and adjustably secured into clevises 243, 244 which pivotally engage pins 245, 246 carried in the levers 236, 242.

The lever 242 is mounted on a pivot pin 247 secured in the tubular section 217 of the horn carrier (Fig. 10). This lever, like lever 225 also has double acting latches 248 which cooperate with locking lugs 249 of a locking element 252 mounted on the frame 52.

Both of the levers 225, 242 thus are operated simultaneously by the hand lever 223 for locking or unlocking the double acting latches, with or from, their respective locking lugs, while the body forming horn 33 also is moved longitudinally of the machine. When the hand lever 223 is shifted from its normal operative or angular position toward the right (Fig. 1) the locking latch instrumentalities are shifted from the locked position illustrated in Fig. 5, to unlocked position as shown in Fig. 4. The horn 33 is thereby released and then may be removed as a unit from its operative position.

Before laterally moving the unlatched horn carrier 206 and the longitudinally shifted horn, the side guide rails 132 (Figs. 1 and 10) and the side guide 159 (see also Fig. 20) must be swung outwardly and downwardly. This frees the horn for its lateral movement. Fig. 4 of the drawings shows the horn in its inoperative shifted position ready for removal and shows one of the spaced arcuate cut-away sections 222 directly opposite the flanged ring 68 of the pressure feeding and forming roller 34.

Usually the horn and its carrier need be drawn out only a short distance to clear away jams which may have occurred and the rollers 219 remain in place on the studs 218. However, both horn and carrier may be taken away entirely as a unit if such is desired. Reverse action of the hand lever 223 upon the horn 33 after the latter is replaced, again restores and locks the horn in its operative position (Fig. 5). Thus the setting of horn parts is not disturbed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fibre can body forming machine, the combination of a frame, support members on said frame, carrier devices movable on said support members, a forming horn secured to and carried by said carrier devices, and feeding devices for advancing the can body blanks along said horn, said carrier devices with said horn being movable laterally of said frame for clearing the horn of jams and for gaining access to the horn.

2. In a fibre can body forming machine, the combination of a frame, support members on said frame, a horn for guiding body blanks along a predetermined path of travel, feeding devices for advancing the body blanks along said horn, a horn carrier suspended from said support members for holding said horn in an operating position, said horn carrier being movable along said support members for shifting the horn into an inoperative position for clearing jammed can body blanks from said horn, said horn carrier also being displaceable from said support members for removing the horn from the machine without disturbing the settings of the machine parts.

3. In a fibre can body forming machine, the combination of a frame, a horn for guiding body blanks along a predetermined path of travel, feeding rollers for advancing the body blanks along said horn, stationary support members mounted on said frame adjacent said horn, and a horn carrier suspended on said support members and adapted to hold the said horn in either operating or inoperating positions, said horn carrier being adapted for withdrawal from said frame to place the said horn in inoperating position so that jammed can body blanks may be cleared from the horn and the surface of the horn exposed for cleaning.

4. In a fibre can body forming machine, the combination of a frame, feeding devices in said frame for advancing can body blanks along a predetermined path of travel, a horn adjacent said feeding devices for guiding the body blanks, a horn carrier for said horn, a pair of spaced and parallel support rails projecting laterally from said frame adjacent said horn carrier, and a plurality of rollers carried on said horn carrier and operating on said support rails, said rollers and said support rails allowing lateral movement of said horn from an operative to an inoperative position for clearing jams of body blanks from the horn, said horn carrier being removable from said support rails for extracting the horn from the machine without disturbing the setting of the machine parts.

5. In a fibre can body forming machine, the combination of a horn for guiding body blanks along a predetermined path of travel, said horn having clearance recesses, forming rollers adjacent the clearance recesses in said horn for bending the blanks around the horn while moving them therealong, a horn carrier for supporting said horn, said carrier being adapted for movement laterally of the machine into an inoperative position for clearing a jam from said horn, and devices for shifting said horn longitudinally of the machine for bringing said clearance recesses into register with said rollers incident to the said lateral movement of the horn into its inoperative position.

6. In a fibre can body forming machine, the combination of a horn for guiding body blanks along a predetermined path of travel, forming rollers adjacent said horn for bending the blanks around the horn while moving them therealong, a horn carrier for supporting said horn, said carrier being adapted for movement laterally of the machine to bring said horn into an inoperative position for clearing a jam from said horn, locking latches for locking said horn and said horn carrier into an operative position, and devices in said horn carrier and operable with said locking latches for shifting said horn longitudinally of the machine for bringing clearance recesses in the horn into a predetermined position relative to said rollers prior to lateral movement of the horn.

7. In a fibre can body forming machine, the combination of a frame for supporting working parts of the machine, a removable horn for guiding body blanks along a predetermined path of travel, feeding devices for advancing the body blanks along said horn, stationary support members mounted on said frame adjacent said horn a horn carrier suspended on said support members for supporting the horn when in operative and in inoperative positions, said horn carrier being movable laterally of the machine so that jammed can body blanks may be cleared from the horn, and locking latches for holding the horn in its operative position and for unlocking said horn carrier incident to its said lateral movement into its inoperative position.

8. In a fibre can body forming machine, the combination of a horn having channel sections, inner rollers located inside of said horn and having their peripheral surfaces substantially tangent to an outer surface of the horn, outer rollers located outside of said horn and each roller having cooperation with a corresponding inside roller for feeding can body blanks along the horn, said horn channels extending longitudinally of the horn and by-passing said inner horn rollers to provide a continuous passageway through the major length of the horn, and means for circulating a cooling medium through said continuous passageway.

9. In a fibre can body forming machine, the combination of a horn having channel sections, a plurality of inner rollers located inside of said horn and having their peripheral surfaces substantially tangent to an outer surface of the horn, certain of said rollers being centrally located and other rollers being located adjacent the front and the rear of said horn, a plurality of outer rollers located outside of said horn and having cooperation with said inside rollers, each outer roller being located in corresponding position to its associated inner roller for feeding can body blanks along the horn, said horn channels extending longitudinally of the horn and passing centrally as well as off center and along the sides of the horn to by-pass said inner horn rollers and to provide a continuous passageway through the major length of the horn, and means for circulating a cooling medium through said continuous passageway.

10. In a fibre can body forming machine, the combination of a horn having channel sections, inner rollers located in spaced relation inside of said horn and having their peripheral surfaces substantially tangent to an outer surface of the horn, outer rollers located outside of said horn, each outer roller having cooperation with a corresponding inside roller for feeding can body blanks along the horn, said horn channels extending longitudinally of the horn and by-passing said inner horn rollers in two sections joined adjacent one end of the horn to provide a continuous passageway through the major length of the horn, and means for circulating a cooling medium through said continuous passageway.

11. In a fibre can body forming machine, the combination of a horn for guiding a crease-lined body blank having a side seam edge coated with adhesive, feeding devices for advancing body blanks along the horn, a radiant heater disposed adjacent said horn and adjoining the path of the moving body blanks for heating the adhesive on said side seam edge, yieldable pressure forming rollers located adjacent said horn and having flanged edge portions for bending the blank at sharp angles along a crease line to position the adhesive on the blank into the path of radiated heat from said radiant heater, and means for bodily moving said horn out of operative position to permit the machine to be readily cleaned of can body jams and undesired deposits of adhesive.

12. In a fibre can body forming machine, the combination of a horn for guiding and shaping a creased body blank having a side seam edge coated with adhesive, pressure forming rollers located adjacent said horn and having flanged edge portions for bending the blank at right angles along a creased line, a radiant heater disposed adjacent said horn for heating the adhesive on said side seam edge, feeding devices for advancing the body blanks along the horn and into said pressure forming rollers and adjacent said radiant heater so that the body blanks as creased in said rollers are brought into position for exposure to said radiant heater during advancement of the body blank along the horn, and means for bodily moving said horn out of operative position to permit the machine to be readily cleaned of can body jams and undesired deposits of adhesive.

13. In a fibre can body forming machine designed for adhesively securing together the longitudinal side seams of such can bodies, the combination of a rectangular shaped horn for guiding can bodies along a predetermined path of travel, feed rollers disposed and operated on opposite sides of said horn, a pair of idler rollers mounted on a common axis within a recess in said horn, each roller having tangential engagement with opposite walls of said bodies and cooperating with said feed rollers for propelling said bodies along the horn, whereby the walls of the body are maintained in an accurately sized rectangular shape, and means for bodily shifting said horn in a lateral direction out of operative position to permit the machine to be readily cleaned of can body jams and objectionable deposits of adhesive.

14. In a fibre can body forming machine designed for adhesively securing together the longitudinal side seams of such can bodies, the combination of a rectangular shaped horn for guiding a crease-lined body blank along a predetermined path of travel, a pressure feeding and flanged forming roller operable adjacent one side of said horn for propelling body blanks along the horn, a pair of spaced disc rollers mounted with their outer edges flush with opposite sides of said horn and having tangential engagement at the corners of the horn against a crease-line of said body blank, said disc rollers also having cooperation with said flanged feed roller for effecting sharp bends on the moving body blank as it is propelled along the horn, and independent separate means for bodily shifting said horn longitudinally and in lateral directions out of operative position to permit the machine to be readily removed of can body jams and undesired deposits of adhesive.

JOHN F. PETERS.